3,041,891
TRANSMISSION
Robert L. Black, Allen Park, and Sheldon E. Thorson, Ann Arbor, Mich., assignors to General Motors Corporation, Detroit, Mich., a corporation of Delaware
Filed Nov. 7, 1957, Ser. No. 694,980
15 Claims. (Cl. 74—677)

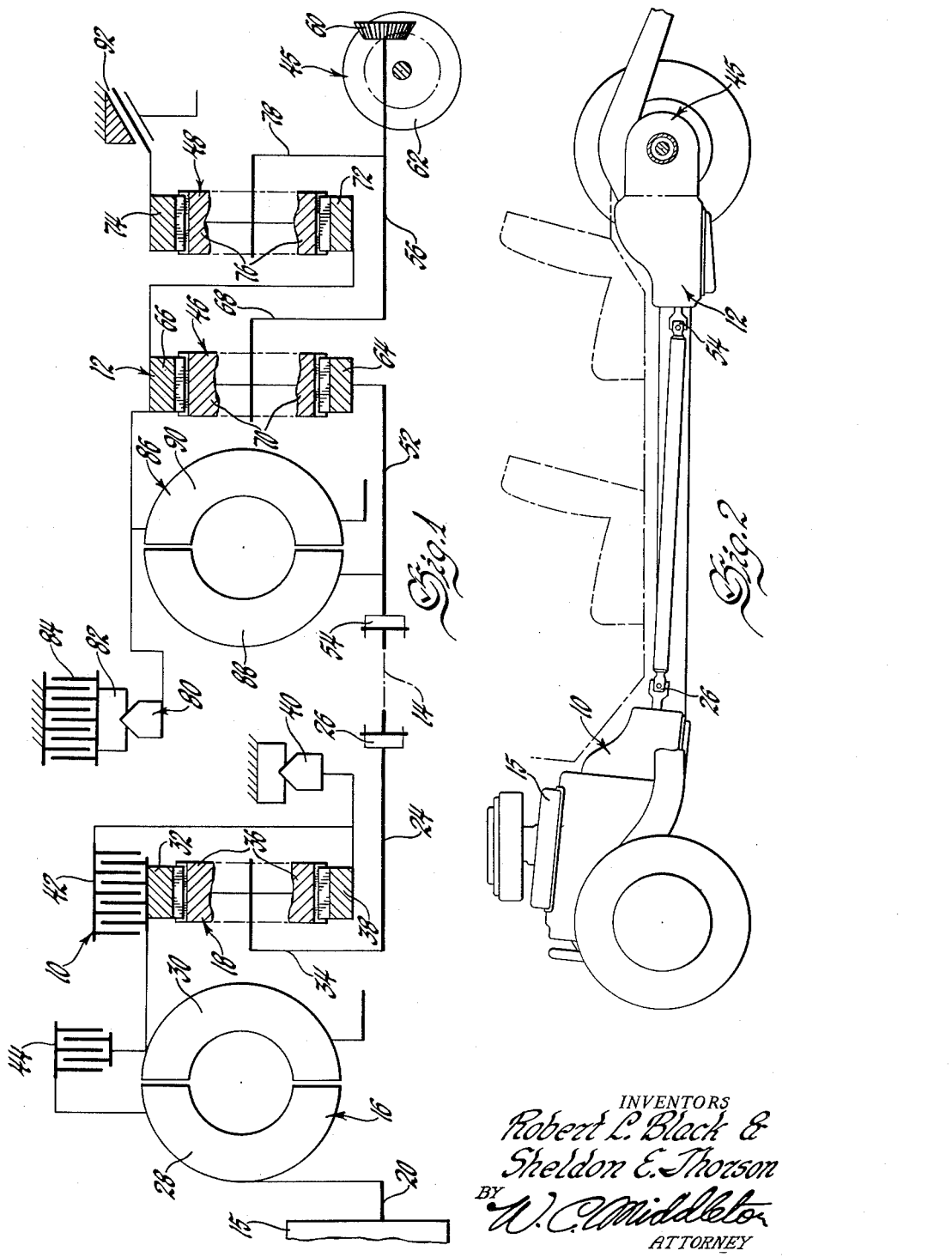

This invention relates to improvements in automatic transmissions arranged for installation, although not exclusively, in motor vehicles.

With lower motor vehicle bodies, the body floor board must be altered to accommodate the drive train between the engine and the rear axle if a minimum road clearance is to be maintained. As a result, a very pronounced bump is formed in the floor board which interferes with passenger comfort.

With this in mind, the invention proposes a variable speed drive for a motor vehicle comprising separate drive connected units, one closely adjacent to the engine and another immediately next to the axle gearing, thereby reducing the bump in the floor board extending along the longitudinal axis of the vehicle. Each unit includes change speed gearing and drive ratio changing devices to furnish a multi-step ratio drive.

In dividing a drive of the foregoing character into units, it is desirable that the same number of ratios be obtainable as when the units are together in one housing. This should be accomplished with as few additional parts as possible so as to not increase the cost.

Therefore, the invention seeks to provide a multi-step ratio transmission which automatically changes from one ratio to another smoothly and in a relatively imperceptible manner and which has the operating components uniquely arranged so as to permit division of the drive with a minimum of parts.

By the invention, a hydrodynamic torque transmitting device is utilized for starting the vehicle while smooth shifts through change speed gearing are produced by combining another hydrodynamic torque transmitting device, which is filled and emptied, with one-way mechanism.

In carrying out the invention, a variable speed drive train is divided into front and rear units. The front unit is positioned immediately adjacent to the engine and includes gearing and a hydrodynamic torque transmitting device which is subsequently locked up after the vehicle attains some predetermined speed while the rear unit is mounted next to the axle gearing and also includes gearing. The two units are drive connected by a power transfer member and together they provide four forward speed ratios and a reverse drive. Those shifts, which are more likely to be noticeable by the operator, are controlled by a hydrodynamic torque transmitting device and one-way mechanism so that, when the device is filled and emptied of fluid to initiate a shift, any shocks are absorbed by the fluid.

The foregoing and other objects and advantages of the invention will be apparent from the following description and from the accompanying drawings in which:

FIGURE 1 illustrates schematically a variable speed drive train demonstrating the principles of the invention.

FIGURE 2 is a view of the drive train installed in a motor vehicle.

Referring to the drawings, particularly FIGURE 2, the numerals 10 and 12 designate, respectively, front engine connected and rear axle connected transmission units which are drive connected by a torque transfer member, such as line shaft 14. The length of the line shaft 14 can be varied to permit installations in different size vehicles.

As shown in FIGURE 1, the front unit 10 is mounted directly behind the vehicle engine 15 and is as close thereto as possible so as to consume a minimum amount of space in this vicinity. The unit 10 includes a hydrodynamic torque transmitting device, e.g., a fluid coupling 16, and a planetary gear set, denoted generally at 18, for transferring drive between an engine connected power shaft 20 and a load shaft 24, the rear end of the latter shaft being joined through a universal type connection 26 to the front end of the line shaft 14. The fluid coupling 16 is of conventional construction utilizing a pump 28 connected to the power shaft 20 to transfer torque through a fluid medium from a suitable source to a turbine 30, in turn, connected to a ring gear 32. A planet carrier 34 for the gear set is connected to the load shaft 24 and has journaled thereon a series of planet pinions 36 which intermesh with ring gear 32 and a reaction sun gear 38.

Two drive ratios are obtainable through the front unit 10, one an under drive and the other a direct drive. For the under drive ratio, a one-way mechanism 40 is utilized to prevent reverse rotation of the reaction sun gear 38. The one-way mechanism 40 may be of known structure employing one-way elements, such as sprags, rollers, or the like, to prevent relative rotation in one direction between two members and to allow free relative rotation in an opposite direction. With the sun gear 38 held and the ring gear 32 being driven forwards, the carrier 34 will, likewise, rotate forwards, but at a reduced speed. When the direct drive ratio through the unit 10 is wanted, a multiple disk type direct drive clutch 42 interposed between the ring and sun gears 32 and 28 is engaged whereupon the gear set 18 will rotate as a unit with planet carrier 34 being driven at the same speed as the driving ring gear 32.

The coupling 16 is used, when the engine is operating, to commence vehicle movement and is so designed that the torque transmitted thereby at idling speeds of the engine will be insufficient to move the vehicle. Consequently, starts are automatic and the driver does not have to release and engage a pedal operated clutch. However, as is well known in the art, fluid losses occur in the coupling due to the inherent slippage. Therefore, at an appropriate vehicle speed, the impeller 28 and turbine 30 are clutched together by a lock-up clutch 44. In this way a mechanical drive is provided between the engine 15 and the gear set 18 with the fluid losses eliminated, hence increasing the efficiency of the drive.

The rear unit 12 is, as depicted in FIGURE 2, disposed in front of conventional bevel type rear axle gearing 45 and is as close thereto as possible. The unit 12 has two planetary gear sets 46 and 48 furnishing, respectively, forward and reverse drive between a driving shaft 52 connected at the front end through a universal joint 54 to the rear end of the line shaft 14 and a driven shaft 56. The driven shaft 56 drives the axle gearing 45 through an attached pinion gear 60 and a mating ring gear 62. The forward driving gear set 46 comprises a sun gear 64 driven by the driving shaft 52, a reaction ring gear 66, and a planet carrier 68 on which are journaled a series of planet pinions 70 intermeshing with the gears 64 and 66. The reverse gear set 48 has a sun gear 72 connected to the ring gear 66 of gear set 46 and a reaction ring gear 74, both intermeshing with a series of planet pinions 76 journaled on an output planetary carrier 78. Both of the carriers 68 and 78 are drive connected to the driven shaft 56.

The gear set 46 is arranged to furnish both an under drive and a substantially direct drive ratio therethrough, as will be apparent. To cause the planet carrier 68 to be rotated forwardly at a reduced speed relative to the driving shaft 52, the reaction ring gear 66 is prevented from rotating backwards. This is accomplished by a one-way mechanism 80, similar to the front unit one-way mechanism 40, comprising an outer race 82 grounded or maintained stationary by a neutral disk type brake 84. By the brake 84 and the one-way mechanism 80, the reaction ring gear 66 is prevented from reverse rotation, but may rotate freely forwards. For direct drive, another hydrodynamic torque transmitting device, for instance, fluid coupling 86, is employed, having a pump member 88 attached to the driving shaft 52 and a turbine member 90 secured to the reaction ring gear 66. During under drive the coupling 86 is void of fluid, but when a shift is wanted the coupling is filled from an appropriate source and will cause the one-way mechanism 80 to release gradually, the coupling fluid absorbing any shock tendencies, and ultimately the sun and ring gear 64 and 66 will be rotated at nearly the same speed. There will be a slight difference in speeds in the gears 64 and 66 due to the inherent slippape in the coupling 86. However, for all practical purposes, the output carrier 68 can be considered driven at the speed of the driving shaft 52.

Reverse drive through the transmission is possible by engaging a cone type reverse brake 92 which restrains the reverse ring gear 74 from rotation in either direction. Since the vehicle will be nearly stationary before reverse is attempted, the driven shaft 36 and, accordingly the planet carriers 68 and 78 will be stationary. Forward rotation of the sun gear 64 of gear set 46 will, with the carrier 68 stationary, rotate the reaction ring gear 66 backwards since, in reverse drive, backward rotation of the ring gear 66 is permitted, the neutral brake 84 being disengaged and the one-way mechanism 80, therefore, ineffective. With the ring gear 66 connected to the input sun gear 72, the drive therefrom will cause the planet carrier 78 to be driven at a reduced speed, also in a reverse direction.

The operation of the transmission is as follows:

To condition the transmission for neutral, lock-up clutch 44, direct drive clutch 42, and neutral brake 84 are all disengaged and fluid coupling 86 is emptied. There is no restraining force with the neutral brake 84 disengaged, preventing reverse rotation of the reaction ring gear 66 and, as a result, drive from the front unit 10, which is possible since the front unit gear set is conditioned for reduced drive with the one-way mechanism 40 effective, cannot be transferred to the driven shaft 56 by the gear set 46. As can be seen, the neutral brake 84, when disengaged, furnishes a positive neutral for the drive train.

Forward drive in first speed is initiated by engaging the neutral brake 84. Then, drive is through the fluid coupling 16 and both the front unit gear set 18 and the rear unit gear set 46 at reduced speeds to the driven shaft 56.

For second speed, the front unit direct drive clutch 42 is engaged so that the front unit gear set 18 is locked up for direct drive. Thus, the ratio in second speed is determined solely by the reduced drive afforded by the rear unit gear set 46.

In third speed, the status of both the front and rear units 10 and 12 is changed. The front unit direct drive clutch 42 is disengaged whereupon the one-way mechanism 40 becomes effective and the front unit gear set 18 is set for under drive. The rear unit planetary gear set 46 is conditioned for direct drive by filling fluid coupling 86. The ratio now is determined by the front unit planetary gear set 18.

Fourth speed is established by engaging the front unit direct drive clutch 42. Hence, the ratio becomes a direct one, except for the previously mentioned slippage.

In forward drive, the lock-up clutch 44 may be engaged at any time after the vehicle has started to move. Preferably, engagement is effected as soon as possible to eliminate the fluid losses, but not at a time that could create a noticeable jar. In other words, the fluid coupling 16 should be kept in operation long enough for a smooth and gradual start and, then, when the members of the coupling 16 attain nearly the same speed, they can be clutched together by the clutch 44 without creating any noticeable sensation to the driver.

In reverse drive, lock-up clutch 44, direct drive clutch 42, and neutral brake 84 are each disengaged and the rear unit coupling 86 is emptied. Reverse brake 92 is engaged and as explained before, the output reverse carrier 78 will be driven at a reduced speed in a reverse direction. It should be noted here that the front unit planetary gear set 18 is conditioned for reduced drive and, therefore, the input sun gear 54 will be driven at a reduced speed so that the gear set 18 does contribute to the overall reverse ratio.

Preferably, since the couplings 16 and 86 require fluid, the brakes and clutches for each unit 10 and 12 are hydraulically actuated. Furthermore, since the number of such brakes and clutches is kept to a minimum, each unit may have an individual pressure source without any necessity for intercommunication through long conduits.

From the foregoing and as depicted in FIGURE 2, it can be seen that by dividing the drive into two transmission units with a minimum of conveniently arranged components, the space required for the drive train along the longitudinal axis of the vehicle is less so that the necessity for any large bump in the floor board is removed. Because the front unit is positioned very close to the engine and the rear unit is as close as is convenient to the axle gearing, the intermediate floor board area above the line shaft would have to be only slightly altered, if at all.

The invention is to be limited only by the following claims.

We claim:

1. In a variable speed drive train for transferring drive between a vehicle engine and wheel driven axle gearing, the combination of a front transmission unit positioned immediately adjacent the engine and driven thereby, the front unit comprising a hydrodynamic torque transmitting device, means locking up the hydrodynamic torque transmitting device, and change speed gearing for providing a plurality of drive ratios therethrough, a rear transmission unit disposed in close proximity to the axle gearing for transmitting drive thereto, the rear unit including a hydrodynamic torque transmitting device and change speed gearing for furnishing a plurality of drive ratios therethrough, and a torque transfer member drive connecting the front and rear units, the front and rear transmission units being so correlated as to deliver drive to the axle gearing in a plurality of automatically attainable final drive ratios representing a combination of the drive ratios from each transmission unit.

2. In a variable speed drive train for transferring drive between a vehicle engine and wheel driven axle gearing; the combination of a front transmission unit positioned immediately adjacent the engine comprising a hydrodynamic torque transmitting device having an impeller driven by the engine, and a turbine, a planetary gear set including an input element connected to the turbine, an output element and a reaction element, means for preventing rotation of the reaction element in one direction to afford one drive ratio through the gear set, and means for clutching together two elements of the gear set to provide another drive ratio therethrough; a rear transmission unit disposed in close proximity to the axle gearing and including a planetary gear set having an input element, an output element driving the axle gearing and a reaction element, means for preventing rotation of the reaction element in one direction to afford one drive ratio through the gear set, and means for clutching together two elements of the gear set to provide another drive ratio therethrough; and a torque transfer member for drive connecting the output element of the front unit gear set and the input element of the rear unit gear set.

3. In a variable speed drive train for transferring drive between a vehicle engine and wheel driven axle gearing; the combination of a front transmission unit positioned immediately adjacent the engine comprising a hydrodynamic torque transmitting device having an impeller driven by the engine, and a turbine, a planetary gear set including an input element connected to the turbine, an output element and a reaction element, means for preventing rotation of the reaction element in one direction to afford one drive ratio through the gear set, and means for clutching together two elements of the gear set to provide another drive ratio therethrough; a rear transmission unit disposed in close proximity to the axle gearing and including a planetary gear set having an input element, an output element driving the axle gearing and a reaction element, another hydrodynamic torque transmitting device for connecting, when filled with fluid, two elements of the gear set to provide one drive ratio therethrough, and means for preventing rotation of the reaction element in one direction, when said another device is empty so as to provide another drive ratio therethrough; and a torque transfer member drive connecting the output element of the front unit gear set and the input element of the rear unit gear set.

4. In a variable speed drive train for transferring drive between a vehicle engine and wheel driving axle gearing; the combination of a front transmission unit positioned immediately adjacent the engine comprising a hydrodynamic torque transmitting device having an impeller driven by the engine, and a turbine, means for connecting the impeller and turbine together to lock up the device, a planetary gear set including an input element connected to the turbine, an output element, and a reaction element, means for preventing rotation of the reaction element in one direction to afford one drive ratio through the gear set, and means for clutching together two elements of the gear set to provide another drive ratio therethrough; a rear transmission unit disposed in close proximity to the axle gearing and including a planetary gear set having an input element, an output element driving the axle gearing and a reaction element, another hydrodynamic torque transmitting device for connecting, when filled with fluid, two elements of the gear set to provide one drive ratio therethrough, and means for preventing rotation of the reaction element in one direction, when said another device is empty, to afford another drive ratio through the gear set; and a torque transfer member drive connecting the output element of the front unit gear set and the input element of the rear unit gear set.

5. In a variable speed drive train for transferring drive between a vehicle engine and wheel driven axle gearing; the combination of a front transmission unit positioned immediately adjacent the engine comprising a hydrodynamic torque transmitting device having an impeller driven by the engine, and a turbine, a lock-up clutch for connecting the impeller and turbine together, a planetary gear set including an input element connected to the turbine, an output element, and a reaction element, a one-way mechanism for preventing rotation of the reaction element in one direction to afford one drive ratio through the gear set, and a clutch for joining together two elements of the gear set to provide another drive ratio therethrough; a rear transmission unit disposed in close proximity to the axle gearing and including a planetary gear set having an input element, an output element driving the axle gearing, and a reaction element, a fluid coupling for connecting, when filled with fluid, two elements of the gear set to provide one drive ratio therethrough and means including a brake engageable for preventing rotation of the reaction element in one direction, when said another device is empty, to afford another drive ratio through the gear set and disengageable for establishing neutral for the drive train; and a torque transfer member drive connecting the output element of the front unit gear set and the input element of the rear unit gear set.

6. In a variable speed drive train for transferring drive between a vehicle engine and wheel driven axle gearing; the combination of a front transmission unit positioned immediately adjacent the engine comprising a hydrodynamic torque transmitting device having an impeller driven by the engine, and a turbine, a front unit planetary gear set including an input element connected to the turbine, an output element, and a reaction element, one-way mechanism for preventing rotation of the reaction element in one direction to afford one drive ratio through the gear set, and a clutch for clutching together two elements of the gear set to provide another drive ratio therethrough; a rear transmission unit disposed in close proximity to the axle gearing and including a rear unit planetary gear set having an input element, an output element driving the axle gearing and a reaction element, a fluid coupling for connecting, when filled with fluid, two elements of the gear set to provide one drive ratio therethrough, means including a brake engageable for preventing rotation of the reaction element in one direction, when said another device is empty, to afford one drive ratio through the gear set and disengageable for establishing neutral for the drive train, a reverse planetary gear set having an input element connected to rear unit reaction element, an output element connected to the rear unit output element and a reaction element, and a reverse brake for holding the reverse element to drive the reverse gear set output element backwards and furnish a reverse drive for the train; and a torque transfer member drive connecting the output element of the front unit gear set and the input element of the rear unit gear set.

7. In a variable speed drive train for transferring drive between a vehicle engine and wheel driven axle gearing; the combination of a transmission unit positioned immediately adjacent the engine and comprising a hydrodynamic torque transmitting device having an impeller driven by the engine, and a turbine, a lock-up clutch engageable for connecting the impeller and turbine; a planetary gear set including an input gear connected to the turbine, a reaction gear and an output planet carrier having journaled thereon a planet pinion intermeshing with the input and reaction gears, a one-way mechanism for preventing rotation of the reaction gear in one direction to provide one drive ratio through the front unit gear set, and a clutch for connecting the reaction input gears together to provide another drive ratio therethrough; a rear transmission unit disposed in close proximity to the axle gearing and comprising a planetary gear set including an input gear, a reaction gear, and an output planet carrier driving the axle gearing and having journaled thereon a planet pinion intermeshing with the input and reaction gears, a fluid coupling interposed between the reaction and input gears and adapted, when filled with fluid, to provide one drive ratio through the rear unit gear set, a one-way mechanism for preventing rotation of the reaction gear in one direction, when the fluid coupling is empty, to provide another drive ratio through the gear set; and a torque transfer member drive connecting the front unit planet carrier and the rear unit input gear.

8. In a variable speed drive train for transferring drive between a vehicle engine and wheel driven axle gearing; the combination of a transmission unit positioned immediately adjacent the engine and comprising a hydrodynamic torque transmitting device having an impeller driven by the engine, and a turbine, a lock-up clutch engageable for connecting the impeller and turbine, a planetary gear set including an input ring gear connected to the turbine, a reaction sun gear and an output planet carrier having journaled thereon a planet pinion intermeshing with the ring and sun gears, a one-way mechanism for preventing rotation of the sun gear in one direction to provide one drive ratio through the gear set, and a clutch for connecting the reaction sun gear and the ring gear together to provide another drive ratio through the gear set; a rear transmission unit disposed in close proximity to the axle gearing and including a planetary gear set having an input sun gear, a reaction ring gear, and an output planet carrier driving the axle gearing and having journaled thereon a planet pinion intermeshing with the sun and ring gears, a fluid coupling interposed between the ring and sun gears and adapted, when filled with fluid, to provide one drive ratio through the gear set, means including a brake engageable for preventing rotation of the reaction ring gear in another direction to provide, when the coupling is empty, another drive ratio through the gear set and disengageable for establishing neutral for the drive train, a reverse planetary gear set including an input sun gear connected to the rear unit ring gear, a reaction ring gear, and a planet carrier drive connected to the axle carrier and having a planet pinion journaled thereon intermeshing with the ring and sun gears, and a reverse brake for holding the reverse ring gear to drive the reverse carrier backwards and furnish a reverse drive for the train; and a torque transfer member drive connecting the planet carrier and the rear unit sun gear.

9. In a transmission; the combination of driving and driven shafts; a hydrodynamic torque transmitting device having an impeller connected to the driving shaft, and a turbine; a first planetary gear set including an input element connected to the turbine, an output element, and a reaction element; means for preventing rotation of the first gear set reaction element in one direction to provide one drive ratio through the first gear set; means for connecting two elements of the first gear set to afford another drive ratio therethrough; a second planetary gear set including an input element connected to the first gear set output element, an output element connected to the driven shaft, and a reaction element; means for preventing rotation of the second gear set reaction element in one direction to afford one drive ratio through the second gear set; and another hydrodynamic torque transmitting device for clutching together two of the elements of the second gear set to provide another drive ratio therethrough.

10. In a transmission; the combination of driving and driven shafts; a hydrodynamic torque transmitting device having an impeller connected to the driving shaft, and a turbine; a first planetary gear set including an input element connected to the turbine, an output element, and a reaction element; a lock-up clutch engageable for connecting the turbine and impeller; a one-way mechanism for preventing rotation of the reaction element in one direction to provide one drive ratio through the first gear set; a clutch for connecting two elements of the first gear set to afford another drive ratio therethrough; a second planetary gear set including an input element connected to the first gear set output element, an output element connected to the driven shaft, and a reaction element; a fluid coupling for clutching together, when filled with fluid, two of the elements of the second gear set to provide one drive ratio through the second gear set; and including a brake engageable for preventing rotation of the second gear set reaction element in one direction, when the fluid coupling is empty, to afford another drive ratio therethrough and disengageable for establishing a neutral for the transmission.

11. In a transmission; the combination of driving and driven shafts; a hydrodynamic torque transmitting device having an impeller connected to the driving shaft, and a turbine; a first planetary gear set including an input element connected to the turbine, an output element, and a reaction element; one-way mechanism for preventing rotation of the first gear set reaction element in one direction to provide one drive ratio through the first gear set; a clutch for connecting two elements of the second gear set to afford another drive ratio therethrough; a second planetary gear set including an input element connected to the first gear set output element, an output element connected to the driven shaft, and a reaction element, a fluid coupling for clutching together, when filled with fluid, two of the elements of the gear set to provide another drive ratio through the gear set; means including a brake engageable for preventing rotation of the second gear set reaction element in one direction, when the fluid coupling is empty, to afford another drive ratio therethrough and disengageable for establishing a neutral for the transmission; a third planetary gear set including an input element connected to the second gear set reaction element, an output element connected to the driven shaft, and a reaction element; and a brake for holding the third gear set reaction element to afford a reverse drive for the transmission.

12. In a transmission; the combination of driving and driven shafts; a hydrodynamic torque transmitting device including an impeller connected to the driving shaft, and a turbine; a first planetary gear set including an input gear connected to the turbine, a reaction gear, and a planet carrier having a planet pinion journaled thereon intermeshing with the input and reaction gears; one-way mechanism for preventing rotation of the first gear set reaction gear in one direction to provide a reduced drive ratio through the first gear set; a clutch for connecting together the first gear set input and reaction gears to provide a direct drive ratio therethrough; a second planetary gear set including an input gear connected to the carrier of the first gear set, a reaction gear, and a planet carrier connected to the driven shaft and having journaled thereon a planet pinion intermeshing with the second gear set input and reaction gears; a fluid coupling having an impeller connected to the second gear set input gear and a turbine connected to the second gear set reaction gear; the fluid coupling, when filled with fluid, clutching together the second gear set reaction and input gears to provide a substantially direct drive ratio through the second gear set; and brake means engageable for preventing rotation of the second gear set reaction gear in one direction, when the fluid coupling is empty, to provide a reduced drive ratio through the second gear set and disengageable to furnish a neutral for the transmission.

13. In a transmission; the combination of driving and driven shafts; a hydrodynamic torque transmitting device including an impeller connected to the driving shaft, and a turbine; a lock-up clutch for joining the impeller and turbine; a first planetary gear set including a ring gear connected to the turbine, a reaction sun gear, and a planet carrier having a planet pinion journaled thereon intermeshing with the ring and sun gear; a one-way brake for preventing rotation of the first gear set sun gear in one direction to provide a reduced drive ratio through the first gear set; a clutch for connecting together the first gear set ring and sun gears to provide a direct drive ratio therethrough; a second planetary gear set including an input sun gear connected to the carrier of the first gear set, a reaction ring gear, and a planet carrier connected to the driven shaft and having journaled thereon a planet pinion intermeshing with the second gear set sun and ring gears; a fluid coupling having an impeller connected to the second gear set sun gear and a turbine connected to the second gear set ring gear; the fluid coupling, when filled with fluid, clutching together the second gear set ring and sun gears to provide a substantially direct drive ratio through the second gear set; and brake means engageable for preventing rotation of the second gear set ring gear in one direction, when the fluid coupling is empty, to provide a reduced drive ratio through the second gear set and disengageable to furnish a neutral for the transmission.

14. In a transmission; the combination of driving and driven shafts; a hydrodynamic torque transmitting device including an impeller connected to the driving shaft, and a turbine; a lock-up clutch for joining the impeller and turbine; a first planetary gear set including a ring gear connected to the turbine, a reaction sun gear, and a planet carrier having a planet pinion journaled thereon intermeshing with the ring and sun gear; a one-way brake for preventing rotation of the first gear set sun gear in one direction to provide a reduced drive ratio through the first gear set; a clutch for connecting together the first gear set ring and sun gears to provide a direct drive ratio therethrough; a second planetary gear set including an input sun gear connected to the carrier of the first gear set, a reaction ring gear and a planet carrier connected to the driven shaft and having journaled thereon a planet pinion intermeshing with the second gear set sun and ring gears; a fluid coupling having an impeller connected to the second gear set sun gear and a turbine connected to the second gear set ring gear; the fluid coupling, when filled with fluid, clutching together the second gear set ring and sun gears to provide a substantially direct drive ratio through the second gear set; brake means engageable for preventing rotation of the second gear set ring gear in one direction, when the fluid coupling is empty, to provide a reduced drive ratio through the second gear set and disengageable to furnish a neutral for the transmission; a third planetary gear set including an input sun gear connected to the second gear set ring gear, a reaction ring gear, and a planet carrier connected to the driven shaft and having journaled thereon a planet pinion intermeshing with the third gear set sun and ring gears; and a reverse brake for preventing rotation of the third gear set ring gear to provide reverse drive through the transmission.

15. In a variable speed drive train for transferring drive between a vehicle engine and wheel driven axle gearing; the combination of a front transmission unit positioned immediately adjacent the engine comprising a hydrodynamic torque transmitting device having an impeller driven by the engine, and a turbine, a lockup clutch for connecting the impeller and turbine together, a planetary gear set including an input element connected to the turbine, an output element and a reaction element, means for preventing rotation of the reaction element in one direction to afford one drive ratio through the gear set, and means for clutching together two elements of the gear set to provide another drive ratio therethrough; a rear transmission unit disposed in close proximity to the axle gearing and including a planetary gear set having an input element, an output element driving the axle gearing and a reaction element, means for preventing rotation of the reaction element in one direction to afford one drive ratio through the gear set, and means for clutching together two elements of the gear set to provide another drive ratio therethrough; and a torque transfer member for drive connecting the output element of the front unit gear set and the input element of the rear unit gear set.

References Cited in the file of this patent

UNITED STATES PATENTS

| | | |
|---|---|---|
| 1,203,265 | Radcliffe | Oct. 31, 1916 |
| 2,193,431 | Probst | Mar. 12, 1940 |
| 2,203,546 | Pollard | June 4, 1940 |
| 2,351,213 | James | June 13, 1944 |
| 2,378,035 | Pollard | June 12, 1945 |
| 2,381,772 | Pentz | Aug. 7, 1945 |
| 2,437,333 | Pollard | Mar. 9, 1948 |
| 2,645,135 | Frank | July 14, 1953 |
| 2,687,657 | Kugel et al. | Aug. 31, 1954 |
| 2,713,273 | Ebsworth | July 19, 1955 |
| 2,831,372 | Boughner | Apr. 22, 1958 |
| 2,858,714 | Black | Nov. 4, 1958 |